May 12, 1953  T. L. BRADY  2,638,532
COMBINED SPECTACLE FRAME AND LIGHT
Filed March 23, 1949
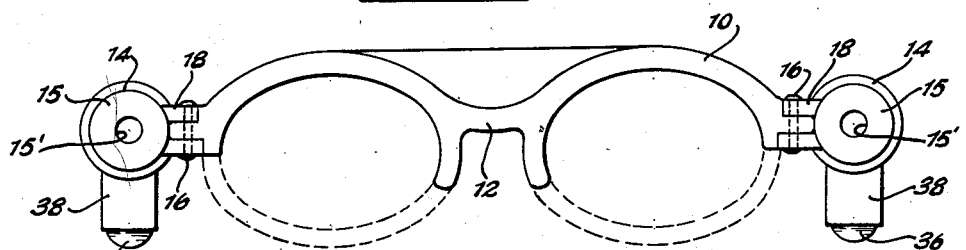
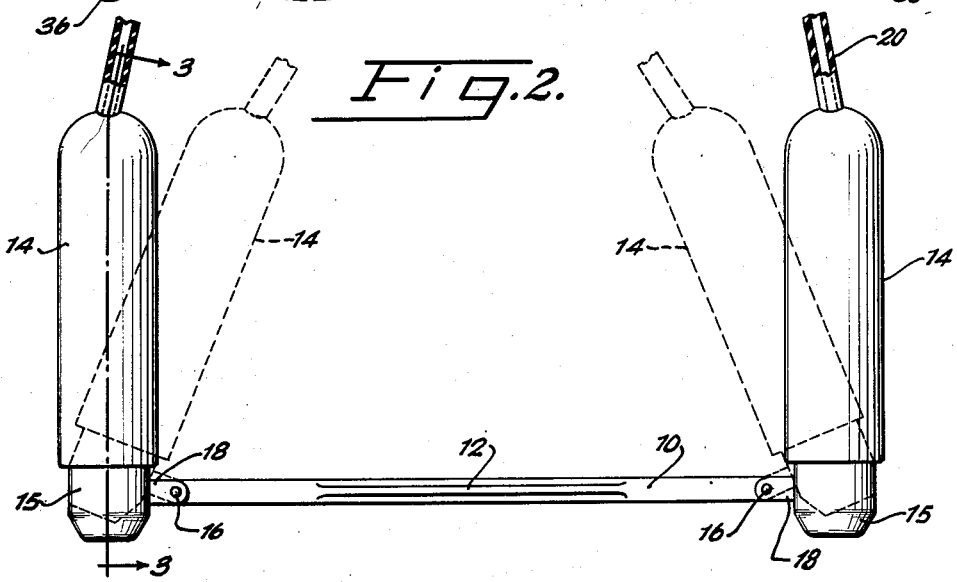
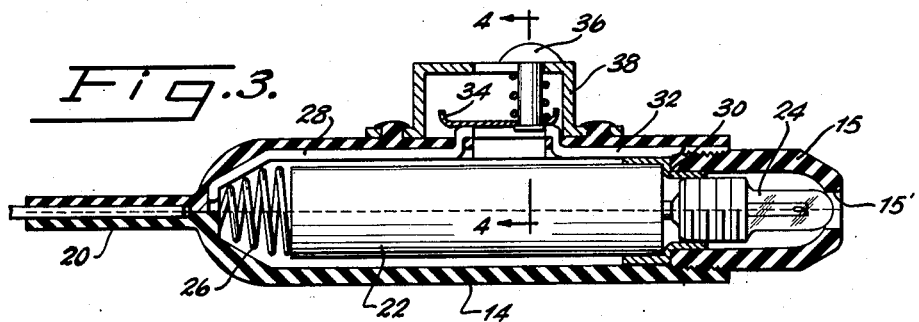
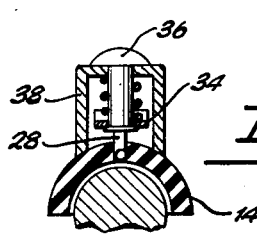
Inventor
THOMAS L. BRADY.
By H. Hamlin Hodges
ATTORNEY Patented May 12, 1953

2,638,532

UNITED STATES PATENT OFFICE 2,638,532

COMBINED SPECTACLE FRAME AND LIGHT

Thomas L. Brady, Henderson City, Ky.

Application March 23, 1949, Serial No. 82,951

1 Claim. (Cl. 240—59)

Innumerable individuals desire to read after they have retired. Very often two individuals use the same bedroom, and one of these people may find it difficult to relax and sleep if a light is ignited while the other is relaxing and reading. Also, a person may desire to arise during the night consequently needing illumination, but not wanting to disturb the other individual using the same room.

An object of my invention is to provide a light suspending spectacle frame which may be used by one person directing light rays in a manner which will not interfere with another person.

A further object is to provide a light suspending spectacle frame which is adapted to direct light rays to one point and not diffuse these rays throughout a large area.

A still further object is to provide a light suspending spectacle frame which is adapted to direct light rays to a desired focal point and not to permit these rays to be diffused to cover a broad area.

An additional object is to provide a light suspending spectacle frame provided with a plurality of individually controlled electric light bulbs.

In the drawings:

Fig. 1 is a view in front elevation;

Fig. 2 is a view in top plan;

Fig. 3 is a vertical cross-section on the line 3—3 of Fig. 2; and

Fig. 4 is a vertical cross-section on the line 4—4 of Fig. 3.

In Figure 1, I have disclosed a light suspending spectacle frame which, in full lines, represents a frame adapted to suspend suitable electric light bulbs and which may have, as disclosed in dotted lines, a complete frame whereby prescribed lenses may be properly positioned in the frame for the use of an individual requiring prescription lenses for proper vision.

The frame 10 is provided with a nose bridge section 12, positioned and centered between two portions of the frame 10 which preferably bow upwardly so that they will not be in the wearer's line of vision. To the ends of the frame 10, I suitably secure by rivets or the like, a bulb and battery holder 14 by means of the conventional rivets 16. The rivets 16 preferably are provided with peened ends to avoid any rough edges which might prove to be inconvenient or annoying.

The bulb and battery holder 14 is sufficiently spaced apart from the pivot point by extended hinge links 18 of sufficient length so that when the light suspending spectacle frame is not in use, the bulb and battery holding case 14 may be folded back to lie in planes approximately parallel with the plane on the frame 10. To the end of the bulb and battery holder 14, remote from the frame 10, I suitably attach conventional temple end pieces 20 which may be designed to have loops bent to extend over the wearer's ears or may be provided in the form of a relatively flat bar to suitably press against the wearer's head for the purpose of holding the spectacle frame in a properly adjusted position.

The bulb and battery holder 14 is suitably shaped so that it may properly hold an electric battery 22, having one terminal positioned to contact the central terminal of an electric light bulb 24. The other terminal, or casing of the battery being in contact with a suitable spring 26 which completes an electric contact with a conduit 28, and urges the batttery toward the light bulb. The bulb 24 is screw-threaded within a metal ferrel 30 which frictionally contacts a conventional insulating case, enclosing the battery 22. The ferrel 30 is in electric contact with a conduit 32 which extends between the surface of the battery and the case 14 to a point spaced apart from the end of a conduit 28 which electrically contacts the outside electrode of the electric battery 22.

As disclosed more clearly in Figs. 3 and 4, it will be noted that a sliding contact 34 is provided to bridge the spaced apart distance between the conduits 28 and 32 when desired. An electric contact therebetween may be closed or opened by a conventional switch comprising a spring urged rivet 36 extending through the housing 38 and loosely affixed to the sliding contact 34. When the rivet 36 and the sliding contact 24 are advanced to the position in which they are shown in Fig. 3, proper electric contact is made beween the battery 22 and the bulb 24. By retracting the rivet 36 and the sliding contact 34 (to the left as viewed in Fig. 3), the circuit will be opened between the conduits 28 and 32.

When the switch is advanced a circuit is complete from the outside casing of the battery 22, through the conduit 32, the ferrel 30 to the outside pole of the light bulb 24; the other pole which is in contact with its central pole of the battery 22.

The electric bulb 24 is adapted to fit snugly within the ferrel 30 as well as within a cap 15 which preferably is screw-threaded to the internal screw-threads of the case 14. Thus, in assembling the battery and light, it will be obvious that the battery 22 will be inserted in the casing 14, subsequently the bulb 24 will be placed within the cap 15; after it has been positioned and frictionally held by the ferrel 30 to afford an electric contact between the ferrel and the external electrode of the bulb 24. Subsequently, by engaging the screw-threads provided on the cap 15 with the internal screw-threads in the end of the casing 14, the bulb 24, and the ferrel 30 will be urged to the position in which they are most clearly shown in Fig. 3. In this manner, the bulb 24 is held in electric circuit with the ferrel 30 and the central pole to the battery 22, the ferrel 30 extending over the insulating covering conventionally provided on the battery. Obviously, the cap 15 is provided at its end remote from the screw-threads thereon with an aperture 15' through which light rays from the bulb 24 may readily pass.

With the foregoing described light suspending spectacle frame, it will be obvious that by advancing the sliding contact 34 into the position in which it is shown in Fig. 3, an electric circuit will be made between the battery 22 and the electric bulb 24, so that light rays may pass directly through the aperture 15'. With this arrangement, it may be readily understood that the wearer of the light suspending spectacle frame, may when desired, direct light rays onto any desired area close to the wearer without the rays being diffused throughout any substantial area. Thus, an individual wanting to read after he has retired, may be readily provided with a sufficient amount of light, the rays of which will be directed on the reading matter he may wish to hold relatively close to his eyes, yet these rays will not be diffused to disturb another person who may be in the near vicinity.

It will be obvious that the light suspending spectacle frame is provided with two electric batteries and light bulbs, both being relatively close to the wearer's eyes. An individual may readily control the intensity of the light rays by using either one of the lights or both. Also in view of the fact that the light bulbs are wholly contained within the caps 15, the rays thereof protruding through the aperture 15', no direct light rays will reach the eyes of the wearer, as they will be focused on the material he desires to see.

I claim:

A light suspending apparatus including a spectacle frame, temple-ends hinged to the said frame, a battery and light enclosing container forming a part of the said temple-ends, and a cap enclosing the said light, the said cap being screw-threaded to the battery container and having a hinge link extending to the said spectacle frame.

THOMAS L. BRADY.

References Cited in the file of this patent

UNITED STATES PATENTS

| Number | Name | Date |
|---|---|---|
| D. 117,127 | Pike | Oct. 10, 1939 |
| 1,615,067 | Boerman | Jan. 18, 1927 |
| 2,166,282 | Benjafield | July 18, 1939 |
| 2,203,469 | Mesch | June 4, 1940 |
| 2,503,850 | Smith et al. | Apr. 11, 1950 |

FOREIGN PATENTS

| Number | Country | Date |
|---|---|---|
| 403,046 | England | Dec. 14, 1933 |
| 491,677 | England | Sept. 7, 1938 |